United States Patent
Chaplik et al.

(10) Patent No.: US 9,674,191 B2
(45) Date of Patent: Jun. 6, 2017

(54) ABILITY FOR AN ADMINISTRATOR TO IMPERSONATE A USER WHEN ACCESSING A USER APPLICATION

(71) Applicant: Red Hat Israel, Ltd., Raanana (IL)

(72) Inventors: Gilad Chaplik, Ramat Gan (IL); Haim Ateya, Givatayim (IL)

(73) Assignee: Red Hat Israel, Ltd., Raanana (IL)

(*) Notice: Subject to any disclaimer, the term of this patent is extended or adjusted under 35 U.S.C. 154(b) by 286 days.

(21) Appl. No.: 13/741,738

(22) Filed: Jan. 15, 2013

(65) Prior Publication Data

US 2014/0130136 A1     May 8, 2014

Related U.S. Application Data

(60) Provisional application No. 61/721,684, filed on Nov. 2, 2012.

(51) Int. Cl.
| | |
|---|---|
| H04L 29/06 | (2006.01) |
| H04L 12/24 | (2006.01) |
| G06F 21/31 | (2013.01) |

(52) U.S. Cl.
CPC ............ H04L 63/10 (2013.01); H04L 41/28 (2013.01); H04L 63/0815 (2013.01); H04L 63/0884 (2013.01); H04L 63/105 (2013.01); H04L 63/168 (2013.01)

(58) Field of Classification Search
CPC ... H04L 63/0815; H04L 63/102; G06F 21/31; G06F 2221/2141

USPC .................................................. 727/2, 4–5, 8
See application file for complete search history.

(56) References Cited

U.S. PATENT DOCUMENTS

| | | | |
|---|---|---|---|
| 8,973,108 B1* | 3/2015 | Roth .................... G06F 21/00 726/1 |
| 2006/0218629 A1* | 9/2006 | Pearson ............ G06F 17/30873 726/8 |
| 2007/0073640 A1* | 3/2007 | Crudele .................... G06F 8/61 |
| 2007/0129987 A1* | 6/2007 | Hauser .................. G06Q 10/10 705/342 |
| 2013/0239178 A1* | 9/2013 | LaRosa ............ G06F 17/30867 726/4 |
| 2014/0020051 A1* | 1/2014 | Lu ...................... G06F 21/6218 726/1 |

* cited by examiner

*Primary Examiner* — Tae Kim
*Assistant Examiner* — Shiuh-Huei Ku
(74) *Attorney, Agent, or Firm* — Lowenstein Sandler LLP

(57) ABSTRACT

A method for an administrator to impersonate a user is provided. A portal manager of a server detects an action initiated in the administrator portal pertaining to a user portal during a current session. The portal manager calculate a current user-to-impersonate identifier using a user identifier associated with the user portal, an administrator identifier associated with the administrator portal, and a session identifier associated with the current session. The portal manager compares the current user-to-impersonate identifier with a stored user-to-impersonate identifier. The portal manager permits the action initiated in the administrator portal to be executed in the user portal when the current user-to-impersonate identifier matches the stored user-to-impersonate identifier.

17 Claims, 5 Drawing Sheets

ABILITY FOR AN ADMINISTRATOR TO IMPERSONATE A USER WHEN ACCESSING A USER APPLICATION

CROSS-REFERENCE TO RELATED APPLICATIONS

This application claims the benefit of U.S. provisional patent application No. 61/721,684 filed Nov. 2, 2012, the disclosure of which is incorporated herein by reference in its entirety.

TECHNICAL FIELD

Embodiments of the present disclosure relate to a computer system, and more specifically, to a method for an administrator to impersonate a user when accessing a user application.

BACKGROUND

Organizations currently use complex networks comprised of multiple resources, such as internal network applications, internet applications and operating systems, with an administrator needing to enter a username and password for each user application being accessed. In some cases, there can be tens to hundreds of different applications with associated usernames and passwords. Not only is manual entry of logins and passwords time-consuming, it is also extremely difficult and time consuming for the administrator to remember or consult a file containing a multitude of passwords.

In one example, a user may contact the administrator with an issue (e.g. a virtual machine is down). The administrator may need to perform several steps, including login in to the user's portal from the administrator's portal, and may run into difficulties by not having the permissions of the user to execute each command needed to log in to the user's portal and to execute each of the user's applications (since the administrator may not have the appropriate permissions for the given application). Resolving the issue may take much valuable administrator time and lower the productivity of both the administrator and the user.

BRIEF DESCRIPTION OF THE DRAWINGS

The present disclosure is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Figure 1A:
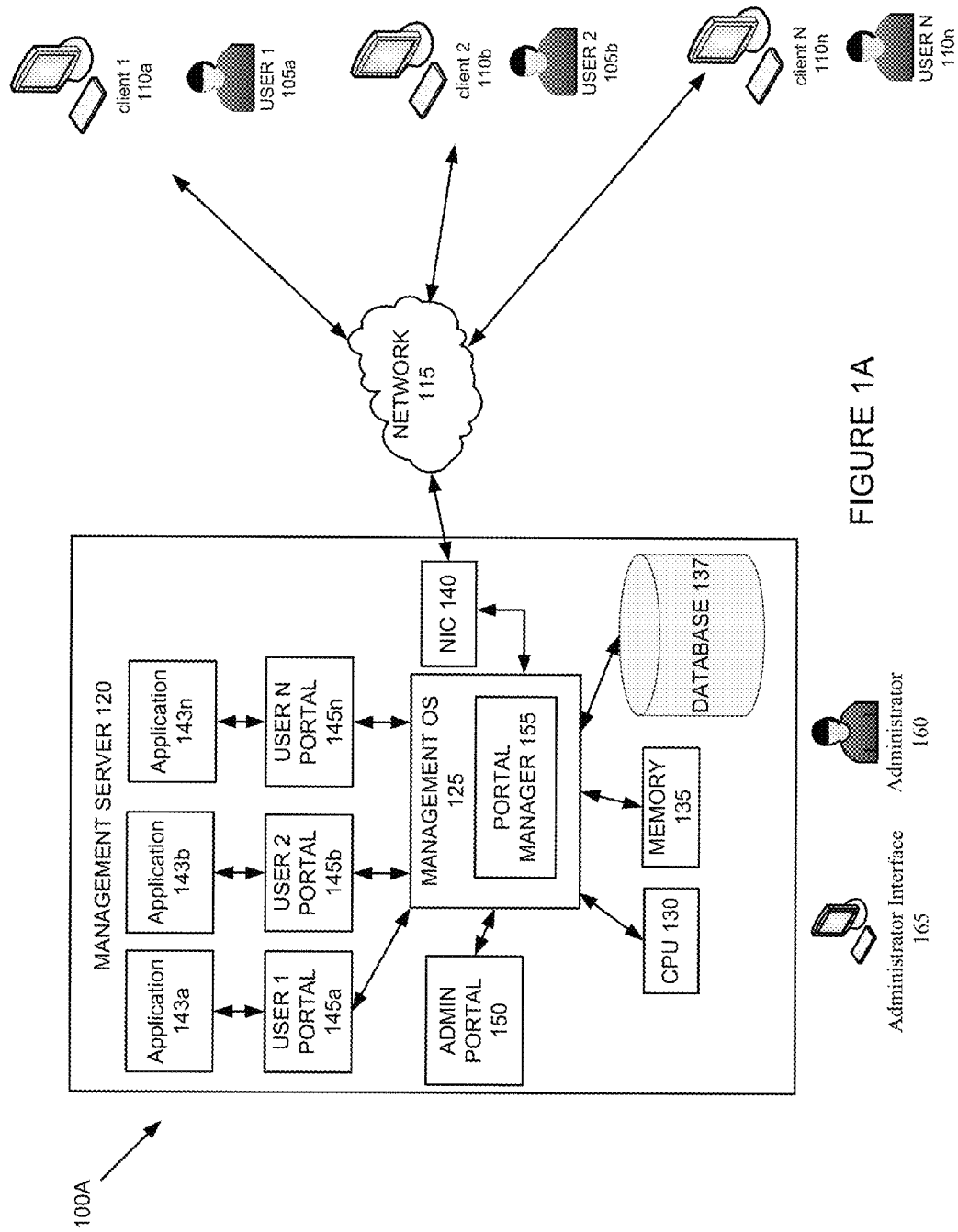
FIG. 1A is a block diagram of one embodiment of a network architecture in which embodiments of the present disclosure may operate.

Methods and systems for an administrator to impersonate a user are described herein. In one embodiment, a portal manager of a management server detects an action initiated in the administrator portal pertaining to a user portal. The portal manager extracts a user identifier associated with the user portal and an administrator identifier associated with the administrator portal. The portal manager determines whether the administrator portal has been granted a role of the user portal based on the administrator identifier and the user identifier. The portal manager permits the action initiated in the administrator portal to be executed in the user portal when the administrator portal has been granted a role of the user portal.

In one embodiment, the portal manager may perform a single sign-on to a plurality of user portals and store a single sign-on session identifier associated with performing the single sign-on in a memory.

In an embodiment, when an administrator accesses the user portal, the portal manager determines whether an associated administrator session identifier is part of a session associated with a previously executed single sign-on action to all of the active user portals. The portal manager may determine whether the administrator session identifier matches the stored single sign-on session identifier and when the administrator session identifier matches the single sign-on session identifier, associate the administrator session identifier with the user portal; otherwise, the portal manager denies the administrator portal access to the user portal.

In an embodiment, the portal manager may determine whether the administrator portal has been granted a role of a user with regards to the user portal by first determining whether a combination of the user identifier and the administrator identifier is present in a static list of combinations of administrator identifiers, user identifiers, and user role granting permissions. When the combination of the user identifier, the administrator identifier and a user role for the administrator identifier is present in the list, the portal manager performs a silent login of the administrator portal to the user portal and grants the administrator portal the role of the user for executing actions in the user portal; otherwise, the portal manager denies the administrator portal access to the user portal.

In an embodiment, the portal manger may calculate a user-to-impersonate identifier based on the user identifier, the administrator identifier, and the administrator session identifier and store the user-to-impersonate identifier in the memory. When the session expires, the portal manager removes the user-to-impersonate identifier from the memory or indicates that the user-to-impersonate identifier is no longer current using other means (e.g., using a flag).

When an administrator subsequently requests to access the user portal or execute an action (e.g., a query or command) in the user portal, the portal manager determines a user-to-impersonate identifier for the administrator request and decides whether the determined user-to-impersonate identifier matches a stored user-to-impersonate identifier that is current. If so, the portal manager allows the administrator request to be performed. Otherwise, the administrator request is denied. In an embodiment, the portal manager calculates a user-to-impersonate identifier based on a current user identifier, a current administrator identifier, and a current administrator session identifier.

Embodiments of the present disclosure have several advantages over manual related art procedures. Returning to the use case described above, when the user contacts the administrator with an issue (e.g. a user's virtual machine is down), the administrator can 'debug' the user's user portal (obtain all its information), and easily resolve the issue. The user can see only the elements that are assigned to them in their portal, and thus may be prone to making mistakes that caused the virtual machine to go down. Since the administrator can see all the elements in the system, the administrator can run the action that the user intended very quickly (e.g., if the user wanted to start a virtual machine, the administrator fixes it from the administrator's portal, and can start the virtual machine from the user portal). The administrator, having the benefit of observing all of the resources of the system, can debug the problem with this additional information in hand. In the process, the user's mistakes may be avoided.

In the following description, numerous details are set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

FIG. 1A is a block diagram of one embodiment of a network architecture 100A in which embodiments of the present disclosure may operate. The network architecture 100A may include a management server 120, configured to communicate with and manage one or more clients 110a-110n over a network 115, in which embodiments of the present disclosure may be implemented. The management server 120 may include a computing machine such as, for example, a server computer, a gateway computer, or any other suitable computer system that is configurable for operating as a management server 120. The management server 120 comprises a management operating system (OS) 125. The management OS 125 may include Microsoft Windows®, Linux®, Solaris®, Mac® OS or any other suitable operating system for managing operations of the client portals 110a-110n.

The management server 120 may comprise one or more central processing units (CPUs) 130, memory 135, a database 137, and a network interface controller (NIC) 140 such as an Ethernet network card for communication over the network 115. The network 115 may be a private network (e.g., a local area network (LAN), wide area network (WAN), intranet, etc.) or a public network (e.g., the Internet).

The management server 120 may comprise other devices (not shown) such as sound or video adaptors, photo/video cameras, printer devices, keyboards, displays, or any other suitable device intended to be coupled to a computer system. Examples of the memory 135 include random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.). In one embodiment, the management server 120 may be configured to implement a portal manager 155 configured to access and impersonate (e.g., invoke and execute) one or more applications 143a-143n that may run in corresponding user portals 145a-145n. A portal, also known as a web portal, is a web site (e.g., a web application program) that brings information, such as files and services from diverse sources to one or more locations on the web site in a unified way. The information for the portal is accessible over the Internet through a web browser of a client. In an embodiment, one or more of the user portals 145a-145n may be accessed by the portal manager 155 and displayed on the administrator interface 165 of the administrator 160 in response to a selection of the one or more users 105a-105n (e.g., by selecting a link to a user identifier in a web browser of the administrator 160).

The user portals 145a-145n and the portal manager 155 may run locally on the management server 120 under the direct control of the management OS 125 (shown) or run remotely under the control of a corresponding operating system (not shown) of one or more of the clients 110a-110n. In another embodiment, user portals 145p-145x may run on corresponding virtual machines 172p-172x remotely under the control of the portal manager 155 over the network 115 of FIG. 1A.

Each of the clients 110a-110n may be a computing device such as, for example, desktop computers, personal computers (PCs), server computers, mobile phones, palm-sized computing devices, personal digital assistants (PDAs), tablet devices, etc. The clients 110a-110n are each communicatively coupled to the network 115 and may have their own operating systems (not shown). In one embodiment, the clients 110a-110n may each have one or more CPUs, memory, and NICs (not shown). In one embodiment, the clients 110a-110n may be configured as, but not limited to, thin clients with functionality primarily integrated in the user portals 145a-145n of the management server 120 as shown.

The server 120 is configured to manage one or more applications 143a-143n of the user portals 145a-145n from the administrator portal 150. In one embodiment, an administrator 160 at the administrator interface 165 may log on to any of one or more currently running user portals 145a-145n without user credentials under the control of the portal manager 155. In one embodiment, the portal manager 155 may permit the administrator portal 150 to impersonate users associated with any of the currently running user portals 145a-145n. By impersonating a user, the portal manager 155 may grant an administrator 160 at an administrator interface 165 the role of a specific user to view, invoke, execute, and receive output data from a user application (e.g., 143a) at an administrator interface 165 that may run in a user portal (e.g. 145a) that may be viewable by one of the users (e.g., 105a) at one of the corresponding clients (e.g., 110a).

The portal manager 155 is configured to detect an action initiated in the administrator portal 150 pertaining to a user portal (e.g., 145a). The portal manager 155 is configured to extract a user identifier associated with the user portal (e.g., 145a), an administrator identifier associated with the administrator portal 150, and an administrator session identifier associated with the administrator portal 150. A session identifier, session ID or session token is a piece of data that is used in network communications (often over HTTP) to identify a session or series of related message exchanges. A session ID is typically granted to a user on their first visit to a web site. It is different from a user ID in that sessions are typically short-lived (they expire after a preset time of inactivity which may be minutes or hours) and may become invalid after a certain goal has been met (for example, by logging out). A session ID is a unique number that a Web site's server assigns to a specific user for the duration of that user's visit (session). Every time an Internet user visits a specific Web site, a new session ID is assigned. Closing a browser and then reopening and visiting the site again generates a new session ID.

When an administrator 160 accesses the user portal 145a for the first time, the portal manager 155 determines whether the administrator session identifier is still part of a session associated with a previously executed single sign-on action to all of the active user portals (e.g., 145a-145n). The administrator 160 may initially log into all of the active user portals (e.g., 145a-145n) without inputting any login identifiers and corresponding passwords (i.e., user credentials) associated with the active user portals (e.g., 145a-145n) by performing the single sign-on to the plurality of user portals (e.g., 145a-145n) accessible to an administrator portal 150. Single sign-on (SSO) is a command or property of access control of multiple related, but independent software systems. With this property, an administrator logs in once and gains access to all active user portals (e.g., 145a-145n) without being prompted to log in again at each of them. Conversely, single sign-off is the property whereby a single action of signing out terminates access to the multiple active user portals (e.g., 145a-145n).

If the administrator session identifier is the same as the session identifier associated with the single sign-on, then the portal manager 155 is configured to determine if the administrator 160 has permission to impersonate a user (e.g., 105a). The administrator 160 may be determined to have permission to impersonate the user 105a when the portal manager 155 determines whether the administrator portal 155 has been granted a role of the user for the user portal (e.g., 145a) based on the administrator identifier and the user identifier.

If this is the first time the administrator 150 attempts to access the user portal 145a, the portal manager 155 is configured to fetch from the database 137 a permission list. The permission list may be a static list created ahead of time in the database 137 by the same or another administrator having super user privileges. The static list comprises combinations of administrator identifiers, user identifiers, and impersonate permissions (also referred to as "user role"). The portal manager 155 searches the list to determine whether a specific administrator identifier is associated with an impersonate permission for a specific user identifier combination in the permission list. If so, the administrator portal 155 (e.g., of the administrator 160) is allowed to impersonate a user of the user portal (e.g. 145a) associated with the user identifier (e.g., of user 105a) and is thus permitted to access the specific user portal 145a as if the administrator 150 were the user (e.g., 105a). If not, then the administrator portal 155 associated with the administrator identifier is denied access by the portal manager 155a to the user portal 145a associated with the user identifier.

If the administrator portal 155 is allowed to impersonate the user of the user portal (e.g. 145a), then the portal manager 155 performs a silent login of the administrator portal 150 to the user portal 145a and the login succeeds. The portal manager 155 then permits execution of the action in the user portal 145a.

The portal manager 155 is configured to create a filter to calculate a user-to-impersonate identifier based on the user identifier, the administrator identifier, and the administrator session identifier (e.g., a hash to an integer) and stores the user-to-impersonate identifier in the memory (e.g., the database 137 or the memory 135) after which the portal manager 155 executes the action (e.g., execution of a command or query) associated with the administrator portal 150 with permissions associated with the user identifier in the user portal (e.g., 145a).

The next time or subsequent time the administrator 160 accesses the user portal 145a or the administrator 160 is already in the portal 145a and executes an action or query, if the session identifier is still valid (i.e., part of the previously executed single sign-on), the check of the permissions file is skipped. The portal manager 155 re-calculates a user-to-impersonate identifier for the combination of the current administrator session identifier, administrator identifier, and user identifier. The portal manager then compares the newly calculated user-to-impersonate identifier to the one stored in the database 137 or the memory 135, and if the same, the portal manager grants the administrator portal 155 access to the user portal 145a and the specific action to be executed in the portal 145a.

Figure 1B:
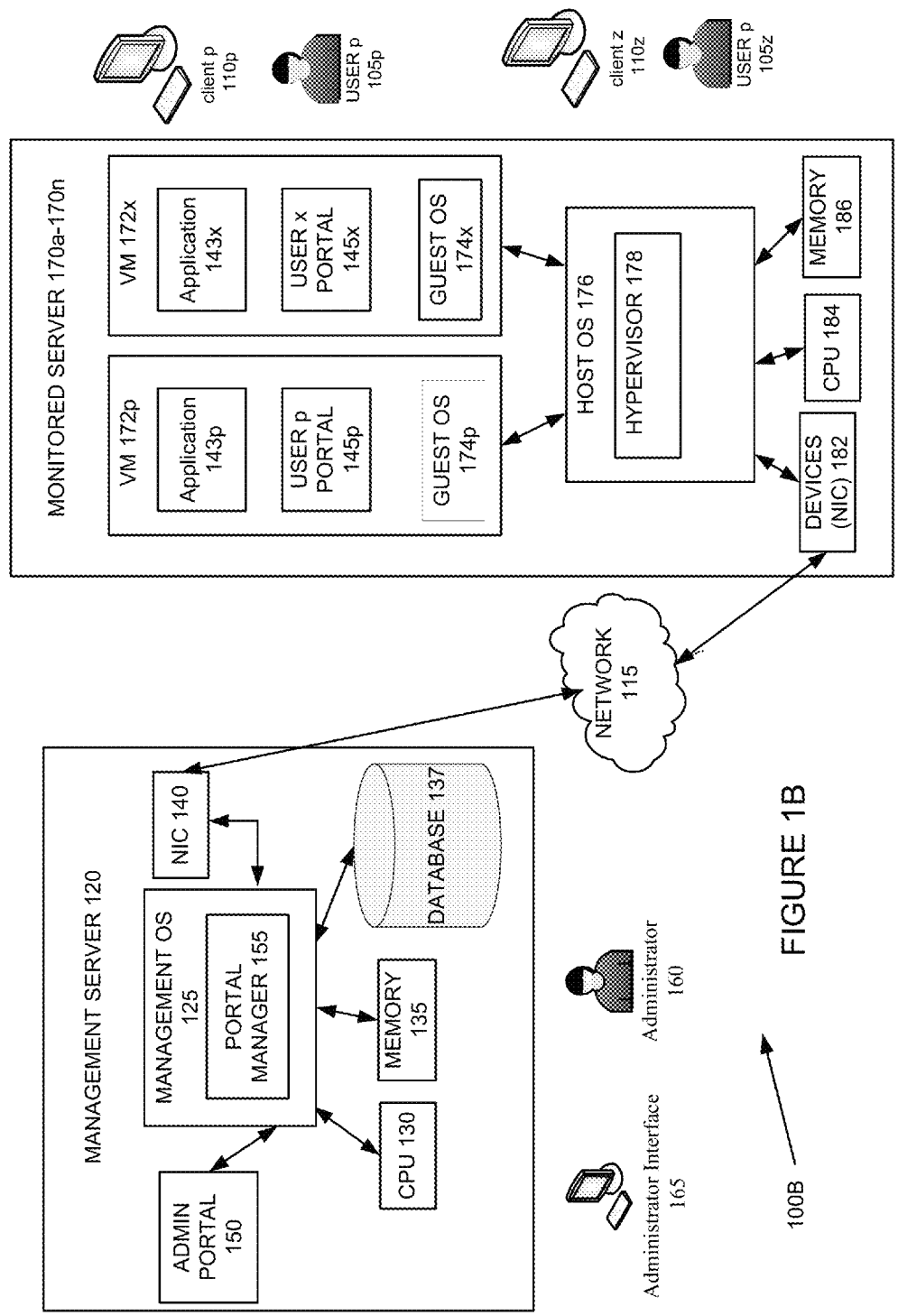
FIG. 1B is a block diagram of another embodiment of a network architecture in which embodiments of the present disclosure may operate.

FIG. 1B is a block diagram of another embodiment of a network architecture 100B in which embodiments of the present disclosure may operate. In one embodiment, the user portals 145p-145x may run on corresponding virtual machines 172p-172x remotely under the control of the portal manager 155 over the network 115 on one or more monitored servers 170a-170n. Each of the monitored servers 170a-170n may be a host machine such as, for example, a server computer, a gateway computer or any other suitable computer system that is configurable for operating as a host. The host machine (also referred to as a host) may comprise an operating system 176 and a hardware platform. The host operating system 176 may include Microsoft Windows®, Linux®, Solaris®, Mac® OS or any other suitable operating system for managing operations on the monitored server 170.

The hardware platform may include one or more central processing units (CPUs) 184, devices 182 (e.g., the NIC 182), and memory 186. The devices 182 may be comprised of one or more hardware and software devices, which may be located internally and externally to a monitored server (e.g., 170a). Examples of the devices 182 include network interface controllers (the NIC 182), sound or video adaptors, photo/video cameras, printer devices, keyboards, displays or any other suitable device intended to be coupled to a computer system. Examples of the memory 186 include random-access memory (RAM), non-volatile storage memory (e.g., Flash, EEPROM, solid state drives (SSD), etc.), magnetic storage memory (e.g., one or more hard drives), optical memory (e.g., CDs, DVD, BlueRay drives, etc.), etc.

A monitored server (e.g., 170a) may host one or more virtual machines (VMs) 172p-172x. A VM (e.g., 172p) is a portion of software that, when executed on appropriate hardware, creates an environment allowing the virtualization of an actual physical computer system. The VM 172p may function as a self-contained platform, comprising one or more virtual CPUs, virtual memory, and virtual devices (not shown) running under the control of a guest operating system (e.g., 174p). The guest operating systems 174p may be the same or different operating system from the host operating system 176. Similar to the host operating system 176, the guest operating system 174p may include Microsoft Windows®, Linux®, Solaris®, Mac® OS or any other suitable operating system for managing operations associated with a virtualization environment.

A hypervisor 178, which emulates the underlying hardware platform for the VMs 172p-172x, is provided and may run on the host OS 176. A hypervisor is also known as a virtual machine monitor (VMM), a kernel-based hypervisor or a host operating system. The hypervisor 178 may support multiple VMs 172*p*-172*x* residing on the host. Alternatively, more than one hypervisor (not shown) may be provided to support multiple VMs residing on the host.

In one embodiment, VM 172*p* includes a user portal 145*p* that allows a user 105*p* to interact with one or more applications 143*p* running in the VM 172*p*. VM 172*p* as well as other VMs residing on one or more monitored servers 170 can be managed by a management server 120. The management server 120 may include a portal manager 155 that allows, an administrator 160 at the administrator interface 165 to log on to any of one or more currently running user portals 145*p*-145*x* without user credentials under the control of the portal manager 155. In one embodiment, the portal manager 155 may permit the administrator portal 150 to impersonate users associated with any of the currently running user portals 145*p*-145*x*. By impersonating a user, the portal manager 155 may permit an administrator 160 at an administrator interface 165 to view, invoke, execute, and receive output data from a user application (e.g., 143*p*) at an administrator interface 165 that may run in a user portal (e.g. 145*p*) that may be viewable by one of the users (e.g., 105*p*) at one of the corresponding clients (e.g., 110*p*).

Figure 2:
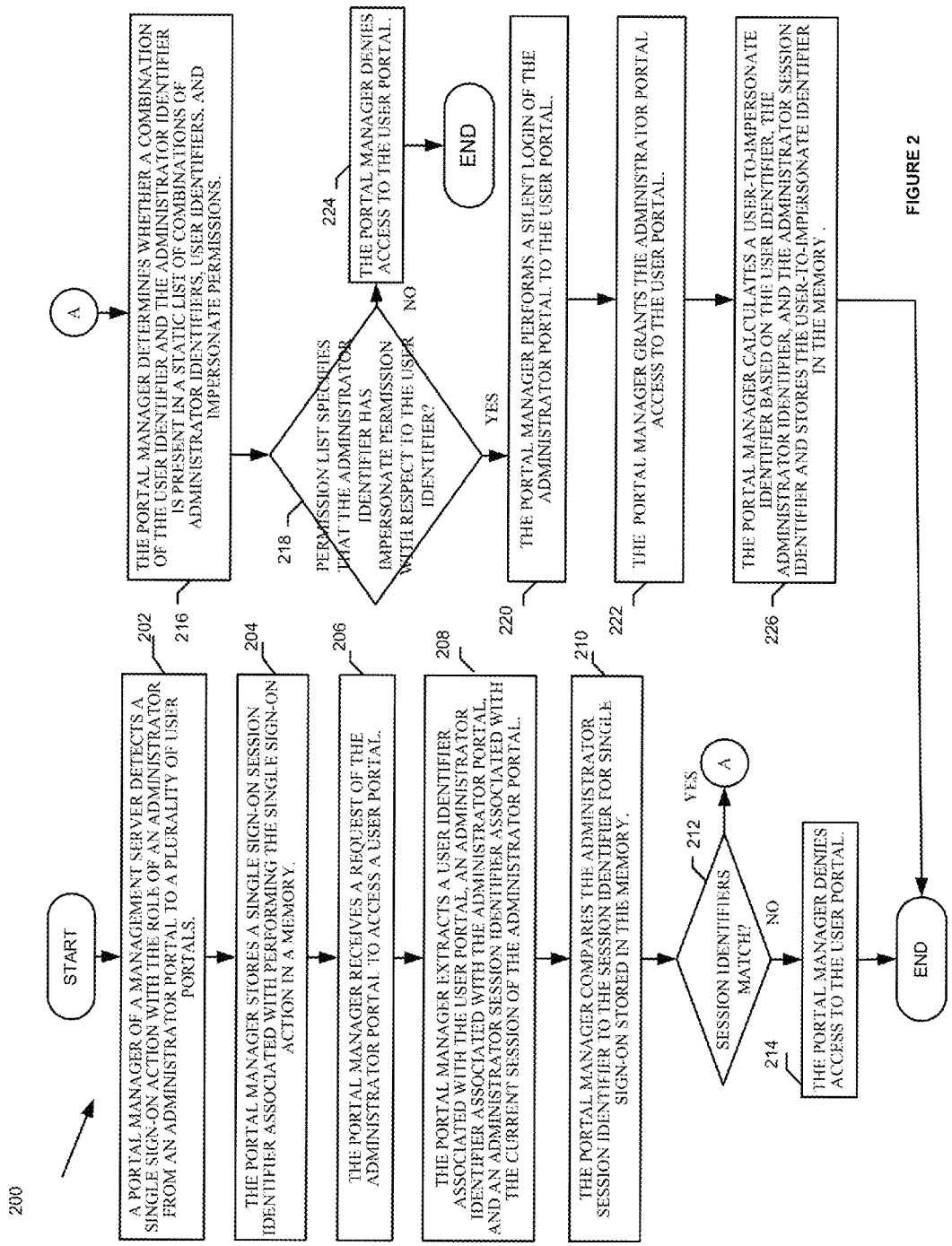
FIG. 2 is a flow diagram illustrating of one embodiment of a method for an administrator to impersonate a user when the administrator accesses a user portal for the first time.

FIG. 2 is a flow diagram illustrating of one embodiment of a method 200 for an administrator 160 to impersonate a user (e.g., 105*a*) when the administrator 160 accesses a user portal (e.g., 145*a*) for the first time. Method 200 may be performed by processing logic (e.g., in computer system 400 of FIG. 4) that may comprise hardware (e.g., circuitry, dedicated logic, programmable logic, microcode, etc.), software (such as instructions run on a processing device), firmware, or a combination thereof. In one embodiment, method 200 is performed by the portal manager 155 of the management server 120 of FIG. 1A or FIG. 1B.

In one embodiment, method 200 begins when, at block 202, the portal manager 155 of the management server 120 detects a single sign-on action with the role of an administrator (e.g., 160) from an administrator portal 150 to a plurality of user portals 145*a*-145*n*. By executing the single sign-on action, the portal manager 155 logs into all of the active user portals (e.g., 145*a*-145*n*) without inputting any login identifiers and corresponding passwords (i.e., user credentials) associated with the user portals (e.g., 145*a*-145*n*). At block 204, a single sign-on session identifier associated with performing the single sign-on action may be stored in a memory (e.g., the database 137 or the memory 135).

At block 206, the portal manager 155 receives a request of the administrator portal 150 to access a user portal (e.g., 145*a*). The administrator interface 165 may display a view (not shown) of the administrator portal 150 in a GUI to the administrator 160. In one embodiment, the administrator portal 150 may display a window that includes a list of currently active users. The administrator 160 may employ an input device (not shown), which may be, for example, a mouse, to select one of the currently active users. One or more clicks of the mouse pointing to an active user may initiate access to the user portal (e.g., 145*a*), causing the portal manager 155 to provide a view of the selected user portal (e.g., a popup of a portal window of the selected user portal (e.g., 145*a*)).

At block 208, the portal manager 155 may extract a user identifier associated with the user portal (e.g., 145*a*), an administrator identifier associated with the administrator portal 150, and an administrator session identifier associated with the current session of the administrator portal 150. At block 210, the portal manager 155 may determine whether the administrator session identifier is still part of the session of the single sign-on by comparing the administrator session identifier to the session identifier for single sign-on stored in the database 137 or the memory 135. At block 212, if the administrator session identifier does not match the session identifier stored in the database 137 or the memory 135, (e.g., the administrator 160 has exited or re-entered their web browser), then at block 216, the portal manager 155 denies the administrator 160 access to the user portal 145*a*.

Otherwise, the portal manager 155 determines whether the administrator portal 150 has permission to impersonate the user (e.g. 105*a*) of the user portal 145*a*. In particular, at block 216, portal manager 155 determines whether a combination of the user identifier and the administrator identifier is present in a static list of combinations of administrator identifiers, user identifiers, and impersonate permissions. The portal manager 155 fetches the static list from the database 137. The permission list may be created and edited by any administrator (e.g., the administrator 160) having super user privileges. If, at block 218, the permission list specifies that the administrator identifier has impersonate permission with respect to he user identifier, then at block 220, the portal manager 155 performs a silent login of the administrator portal 150 to the user portal 145*a*. Since the user portal (e.g., 145*a*) and the administrator portal 150 are associated with the same server (e.g., the management server 120) and are associated with the same database (e.g. 137), the user portal (e.g., 145*a*) receives the same permission checks as the administrator portal 150 and the login succeeds.

At block 222, the portal manager 155 grants the administrator portal 150 access to the user portal 145*a*; otherwise, at block 224, the portal manager 155 denies the administrator portal 155 access to the user portal 145*a*.

At block 226, the portal manager 155 creates a filter to calculate a user-to-impersonate identifier based on the user identifier, the administrator identifier, and the administrator session identifier (e.g., a hash to an integer) and stores the user-to-impersonate identifier in the memory (e.g., the database 137 or the memory 135).

Figure 3:
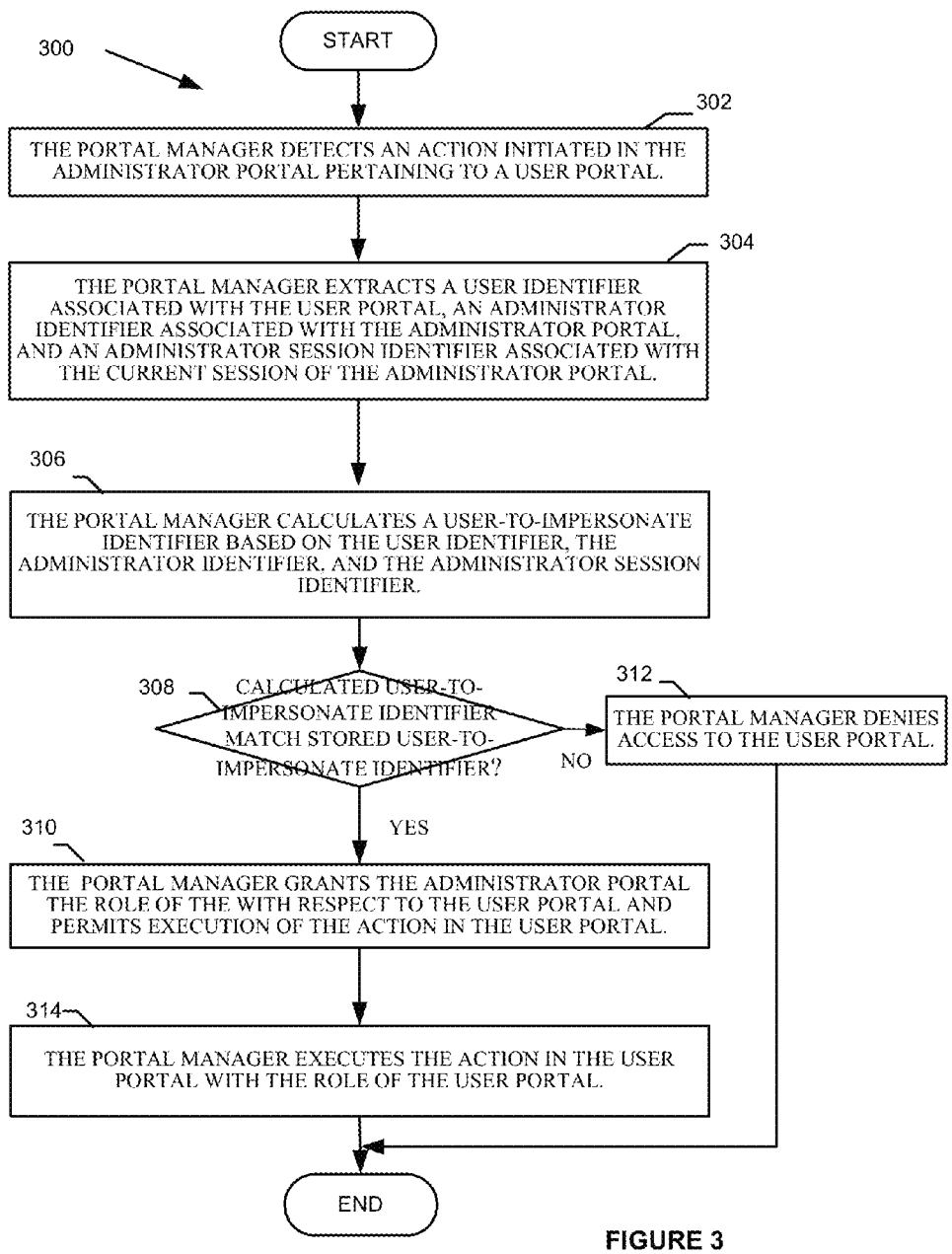
FIG. 3 is a flow diagram illustrating of one embodiment of a method for an administrator to impersonate a user once the administrator is successfully logged into a user portal.

FIG. 3 is a flow diagram illustrating of one embodiment of a method 300 for an administrator 160 to impersonate a user (e.g., 105*a*) once the administrator is successfully logged into a user portal (e.g., 145*a*). Method 300 may be performed by processing logic (e.g., in computer system 400 of FIG. 4) that may comprise hardware (e.g., circuitry, dedicated logic, programmable logic, microcode, etc.), software (such as instructions run on a processing device), firmware, or a combination thereof. In one embodiment, method 300 is performed by the portal manager 155 of the management server 120 of FIG. 1A or 1B.

In one embodiment, method 300 begins when, at block 302, the portal manager 155 of the management server 120 detects an action (e.g. an attempt to execute a command or query in the application 143*a*) initiated in the administrator portal 150 pertaining to a user portal (e.g., 145*a*). At block 304, the portal manager 155 may extract a user identifier associated with the user portal (e.g., 145*a*), an administrator identifier associated with the administrator portal 150, and an administrator session identifier associated with the current session of the administrator portal 150. At block 306, the portal manager 155 calculates a user-to-impersonate identifier based on the extracted user identifier, the extracted administrator identifier, and the extracted current administrator session identifier. At block 308, the portal manager 155 determines whether the calculated user-to-impersonate identifier matches the user-to-impersonate identifier previously stored in the database 137 or the memory 135. If, at block 308, the calculated user-to-impersonate identifier matches the stored user-to-impersonate identifier, then at block 310, the portal manager 155 grants the administrator portal 155 the role of the user with respect to the user portal 145a and permits execution of the action in the user portal 145a; otherwise, at block 312, the portal manager 155 denies the administrator portal 155 access to the user portal 145a. At block 314, the portal manager 155 executes the action (e.g., execution of a command or query) associated with the administrator portal 150 with permissions associated with the user identifier in the user portal (e.g., 145a).

Thus, the administrator 160 can administer a user portal (e.g., 145a) in the administrator portal 150 filtered with the permissions (views and actions) and quota (on resources) of the user (e.g. 105a) that is reflected in the display 165 of the administrator 160. The administrator 160 can even perform actions in the user portal (e.g., 145a) (that both the user 105a and administrator 160 have a right to perform) and resulting actions may be written to the administrator account. Data output from the user task invoked by the administrator 160 may then be recorded under the administrator's name (and not under user name), e.g., to a file, and/or be displayed to the administrator 160 at the administrator interface 165, under an identity of the administrator 160 in the administrator portal 150.

Figure 4:
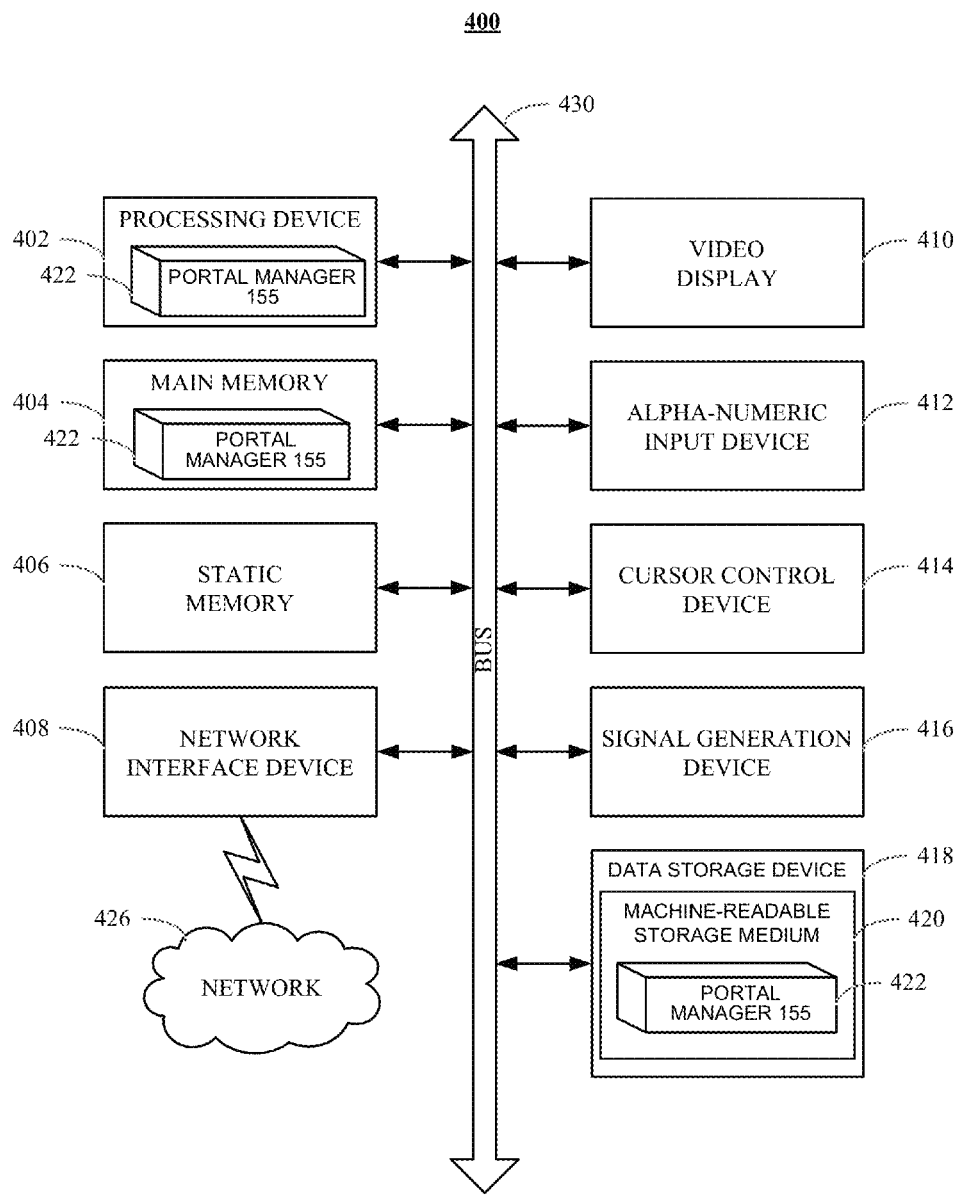
FIG. 4 illustrates a diagrammatic representation of a machine in the example form of a computer system within which a set of instructions, for causing the machine to perform any one or more of the methodologies discussed herein, may be executed.

FIG. 4 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute processing logic 422 for implementing portal manager 155 for performing the operations and steps discussed herein.

Computer system 400 may further include a network interface device 408. Computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

Data storage device 418 may include a machine-readable storage medium (or more specifically a computer-readable storage medium) 420 having one or more sets of instructions (i.e., processing logic 422) embodying any one or more of the methodologies of functions described herein. The processing logic 422 may also reside, completely or at least partially, within main memory 404 and/or within processing device 402 during execution thereof by computer system 400; main memory 404 and processing device 402 also constituting machine-readable storage media. The processing logic may further be transmitted or received over a network 426 via network interface device 408.

Machine-readable storage medium 420 may also be used to store the device queue manager logic persistently. While machine-readable storage medium 420 is shown in an example embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present disclosure also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Although the present disclosure has been described with reference to specific example embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method, comprising:
    detecting, by a processing device, an action initiated in an administrator portal associated with a user pertaining to a user portal during a current session of the administrator portal, the current session having a current session identifier associated with the administration portal;
    calculating, by the processing device, a current user-to-impersonate identifier comprising a combination of a user identifier associated with the user portal, an administrator identifier associated with the administrator portal, and the current session identifier associated with the administration portal;
    comparing, by the processing device, the current user-to-impersonate identifier with a user-to-impersonate identifier previously stored by the processing device, the stored user-to-impersonate identifier comprising a combination of the user identifier, the administrator identifier, and a single sign-on session identifier associated with the administrator portal, the single sign-on session identifier extracted by the processing device from a prior single sign-on by the processing device in the administrator portal to active portals comprising the user portal;
    responsive to determining that the current user-to-impersonate identifier matches the stored user-to-impersonate identifier:
        granting, by the processing device, the administrator portal the role of the user associated with the user portal; and
        executing, by the processing device, the action initiated in the administrator portal with permissions associated with the user identifier in the user portal; and
    responsive to determining, by the processing device, that the current user-to-impersonate identifier does not match the stored user-to-impersonate identifier, and responsive to determining, by the processing device, that a combination of the user identifier, the administrator identifier, and a user role for the administrator is present in a static list:
        performing a silent login of the administrator portal to the user portal,
        granting the administrator portal the role of the user associated with the user portal,
        creating a new user-to-impersonate identifier using the user identifier, the administrator identifier, and a single sign-on session identifier associated with the silent login; and
        executing, by the processing device, the action initiated in the administrator portal with permissions associated with the user identifier in the user portal.

2. The method of claim 1, further comprising:
    prior to detecting the action initiated in the administrator portal pertaining to the user portal, performing the single sign-on to the active portals comprising the user portal; and
    storing the single sign-on session identifier associated with the single sign-on in a memory.

3. The method of claim 2, further comprising detecting a request of the administrator portal to access the user portal.

4. The method of claim 1, further comprising storing the new user-to-impersonate identifier in the memory.

5. The method of claim 1, wherein the list is editable by a super user.

6. The method of claim 1, wherein the administrator portal and the user portal receive the same permission check.

7. The method of claim 1, further comprising generating on a display a view of the user portal.

8. The method of claim 7, wherein the action and subsequent output associated with the action are recorded to an account associated with the administrator identifier.

9. The method of claim 8, wherein generating a view of the user portal comprises instantiating a new window containing the user portal within or distinct from a window containing the view of the administrator portal.

10. A system, comprising:
    a memory;
    a processing device, operatively coupled to the memory, the processing device to:

detect an action initiated in an administrator portal associated with a user pertaining to a user portal during a current session of the administrator portal, the current session having a current session identifier associated with the administration portal;

calculate a current user-to-impersonate identifier comprising a combination of a user identifier associated with the user portal, an administrator identifier associated with the administrator portal, and the current session identifier associated with the administration portal;

compare the current user-to-impersonate identifier with a user-to-impersonate identifier previously stored by the processing device, the stored user-to-impersonate identifier comprising a combination of the user identifier, the administrator identifier, and a single sign-on session identifier associated with the administrator portal, the single sign-on session identifier extracted by the processing device from a prior single sign-on by the processing device in the administrator portal to active portals comprising the user portal;

responsive to determining that the current user-to-impersonate identifier matches the stored user-to-impersonate identifier:
 grant the administrator portal the role of the user associated with the user portal; and
 execute the action initiated in the administrator portal with permissions associated with the user identifier in the user portal;

responsive to determining that the current user-to-impersonate identifier does not match the stored user-to-impersonate identifier, and responsive to determining that a combination of the user identifier, the administrator identifier, and a user role for the administrator is present in a static list:
 perform a silent login of the administrator portal to the user portal,
 grant the administrator portal the role of the user associated with the user portal,
 create a new user-to-impersonate identifier using the user identifier, the administrator identifier, and a single sign-on session identifier associated with the silent login; and
 execute the action initiated in the administrator portal with permissions associated with the user identifier in the user portal.

11. The system of claim 10, wherein the processing device is further to:
 prior to detecting the action initiated in the administrator portal pertaining to the user portal, perform the single sign-on to the active portals comprising the user portal; and
 store the single sign-on session identifier associated with the single sign-on in a memory.

12. The system of claim 11, wherein the processing device is further to detect a request of the administrator portal to access the user portal.

13. The system of claim 10, wherein the processing device is further to store the new user-to-impersonate identifier in the memory.

14. A non-transitory computer-readable storage medium including instructions that, when accessed by a processing device, cause the processing device to:
 detect an action initiated in an administrator portal associated with a user pertaining to a user portal during a current session of the administrator portal, the current session having a current session identifier associated with the administration portal;

calculate a current user-to-impersonate identifier comprising a combination of a user identifier associated with the user portal, an administrator identifier associated with the administrator portal, and the current session identifier associated with the administration portal;

compare the current user-to-impersonate identifier with a user-to-impersonate identifier previously stored by the processing device, the stored user-to-impersonate identifier of comprising a combination of the user identifier, the administrator identifier, and a single sign-on session identifier associated with the administrator portal, the single sign-on session identifier extracted by the processing device from a prior single sign-on by the processing device in the administrator portal to active portals comprising the user portal;

responsive to determining that the current user-to-impersonate identifier matches the stored user-to-impersonate identifier:
 grant the administrator portal the role of the user associated with the user portal; and
 execute the action initiated in the administrator portal with permissions associated with the user identifier in the user portal;

responsive to determining that the current user-to-impersonate identifier does not match the stored user-to-impersonate identifier, and responsive to determining that a combination of the user identifier, the administrator identifier, and a user role for the administrator is present in a static list:
 perform a silent login of the administrator portal to the user portal,
 grant the administrator portal the role of the user associated with the user portal,
 create a new user-to-impersonate identifier using the user identifier, the administrator identifier, and a single sign-on session identifier associated with the silent login; and
 execute the action initiated in the administrator portal with permissions associated with the user identifier in the user portal.

15. The non-transitory computer-readable storage medium of claim 14, wherein the processing device is further to:
 prior to detecting the action initiated in the administrator portal pertaining to the user portal, performing the a single sign-on to the active portals comprising the user portal; and
 store the single sign-on session identifier associated with the single sign-on in a memory.

16. The non-transitory computer-readable storage medium of claim 15, wherein the processing device is further to detect a request of the administrator portal to access the user portal.

17. The non-transitory computer-readable storage medium of claim 14, wherein the processing device is further to store the new user-to-impersonate identifier in the memory.

* * * * *